Patented Sept. 28, 1943

2,330,234

UNITED STATES PATENT OFFICE 2,330,234

INSECTICIDE

Clarence L. Moyle, Midland, Mich., assignor to The Dow Chemical Company, Midland, Mich., a corporation of Michigan No Drawing. Application May 1, 1942, Serial No. 441,378

7 Claims. (Cl. 167—24)

This invention relates to insecticidal materials and particularly to composition in which a di-(monochloro-phenoxy)-methane is employed as a toxic ingredient.

Many synthetic organic materials have been suggested for use as insecticidal toxicants and as substitutes for pyrethrum, rotenone, and other naturally occurring products. Almost without exception these toxicants are injurious to plant foliage so that their use must be carefully controlled both with respect to amounts and concentrations employed, and time of application. A further disadvantage inherent in many of the synthetic toxicants heretofore employed has been their toxicity to humans and incompatibility with other common insecticidal materials.

Many aliphatic and aromatic ethers have been employed as insecticidal toxicants but, almost without exception, have proven unsatisfactory because of tendencies to produce severe injury to plant foliage, high volatility, and/or low toxicity to insect pests whereby the amounts required to obtain control are not economically practical.

I have discovered that di-(monochloro-phenoxy)-methanes are effective as an insecticidal toxicant, and that compositions comprising the same in the concentrations required for insect control may be applied to growing foliage according to standard spraying and dusting procedures without causing commercial injury thereto. Any suitable amount of such ether may be employed, although from about 0.03 to about 5 per cent by weight of the toxicant in spray compositions and from about 1 per cent to about 10 per cent in dust compositions has been found to give satisfactory results.

The di-(4-chloro-phenoxy)-methane, which is the preferred toxicant of the invention, is a solid, boiling at 189°–194° C. at 6 mm. pressure and melting at 67°–69° C. This compound is prepared by reacting equimolecular proportions of sodium with 4-chloro-phenol in a solvent such as absolute ethanol and thereafter treating the alcoholic dispersion of phenolate with one-half molecular proportion of dichloro-methane at a temperature ranging between 80° and 150° C. and under autogenous pressure. The reaction is generally complete within from about 8 to 12 hours. The mixture is then cooled, diluted with water, and the insoluble di-(4-chloro-phenoxy)-methane recovered by extraction and fractional distillation of the extract. The compound so obtained is soluble in many organic solvents, readily absorbed by finely divided solid diluents and carriers, and appears to have little or no toxicity to humans. The di-(2-chloro-phenoxy)-methane and di-(3-chloro-phenoxy)-methane may be prepared in a similar manner.

The di-(monochloro-phenoxy)-methane may be variously utilized to prepare insecticidal compositions. The determining factors with respect to the particular composition and concentration employed are the type of insect to be controlled and the circumstances under which such control is to be accomplished. In one embodiment of the invention, the new toxicant may be employed as a constituent of oil in water emulsions or in water dispersions with or without the addition of emulsifying, wetting, or dispersing agents. A preferred procedure comprises dispersing the toxicant on or in finely divided carriers such as diatomaceous earth, bentonite, talc, volcanic ash, wood flour, and the like to obtain compositions adapted to be employed either as dusts or in water suspension. The toxicant may also be incorporated in other standard insecticidal compositions and/or in combination with common insect poisons such as lead arsenate, pyrethrum, rotenone, sulfur, copper sprays and related materials.

The di-(monochloro-phenoxy)-methanes appear to function both as stomach and contact poisons. Thus, such toxicant is effective against red spider and red mites as a contact poison and is also adapted for the control of chewing insects. In the latter instance the synthetic ether toxicant serves as a substitute for rotenone, although it may be employed in combination with either rotenone or pyrethrum if desired.

A copending application Serial No. 441,377 filed concurrently herewith describes and claims the di-(monochloro-phenoxy)-methanes as new chemical compounds.

The following examples illustrate the invention but are not to be construed as limiting the same.

Example 1

19.5 parts by weight of di-(4-chloro-phenoxy)-methane, 78.1 parts of diatomaceous earth, and 2.4 parts of sodium lauryl sulfate were ground together to form a dust composition. This composition was employed as a concentrate for the preparation of aqueous spray mixtures for the control of red spider adults. When sufficient of the concentrate was dispersed in water to give a concentration of two pounds of di-(4-chloro-phenoxy)-methane per 100 gallons, the control of red spider on beans sprayed with the mixture was 100 per cent. No injury to the bean foliage was observed.

Example 2

19.4 parts of di-(4-chloro-phenoxy)-methane, 77.4 parts of diatomaceous earth, and 3.2 parts of sodium lauryl sulfate were ground together as described in Example 1, and the resulting parasiticidal concentrate dispersed in water and employed for the control of Mexican bean beetle larvae. At a concentration of 1.5 pounds of toxicant per 100 gallons, the control obtained against third instar larvae was 98.3 per cent. In a control determination using magnesium arsenate, the kill of larvae was but 36.1 per cent.

Example 3

Di-(4-chloro-phenoxy)-methane, bentonite, and plaster of Paris were mixed together in dust form and thereafter slurried with water to form a thick plaster-like sludge. This sludge was dried and thereafter ground with sodium lauryl sulfate to obtain a final composition comprising 20 per cent by weight of di-(4-chloro-phenoxy)-methane, 5 per cent of bentonite, 74 per cent of gypsum, and 1 per cent of sodium lauryl sulfate. This dust mixture was dispersed in water in such amount as to form a spray composition containing 1.5 pounds of di-(4-chloro-phenoxy)-methane per 100 gallons. When applied against the Mexican bean beetle larvae, third instar, the spray composition gave a kill of 100 per cent with no injury to foliage. A control determination employing an equivalent amount of magnesium arsenate gave a kill of but 20 per cent.

Example 4

Di-(4-chloro-phenoxy)-methane was dissolved in a light kerosene fraction in the amount of 2.4 grams per 100 milliliters. This composition gave a kill against 5-day old house flies of from 35 to 40 per cent in 24 hours and a knockdown of from 80 to 90 per cent in ten minutes. When pyrethrum was added to this combination, both kill and knock-down were materially increased, and a synergistic effect as between the two toxicants was indicated.

In a similar manner di-(2-chloro-phenoxy)-methane and di-(3-chloro-phenoxy)-methane may be compounded with inert carriers to form spray and dust compositions falling within the scope of the present invention. Also, the compositions of the present invention may be employed for the control of insect and mite pests other than those disclosed above, e. g. aphids, thrips, cockroaches, mosquitoes, etc.

Other modes of applying the principle of my invention may be employed instead of those explained, change being made as regards the materials or the amounts employed, provided the ingredients stated by any of the following claims or their equivalent be employed.

I therefore particularly point out and distinctly claim as my invention.

1. An insecticidal composition comprising di-(mono-chloro-phenoxy)-methane as an active toxic ingredient.

2. An insecticidal composition comprising a finely divided inert carrier and dispersed thereon di-(mono-chloro-phenoxy)-methane as an active toxicant.

3. An insecticidal spray comprising di-(mono-chloro-phenoxy)-methane as an active toxicant.

4. An insecticidal composition comprising di-(4-chloro-phenoxy)-methane as an active toxic ingredient.

5. An insecticidal composition comprising a finely divided inert carrier and dispersed thereon di-(4-chloro-phenoxy)-methane as an active toxicant.

6. An insecticidal spray comprising di-(4-chloro-phenoxy)-methane as an active toxicant.

7. An insecticidal spray comprising as active toxicants pyrethrin and di-(4-chloro-phenoxy)-methane.

CLARENCE L. MOYLE.